UNITED STATES PATENT OFFICE.

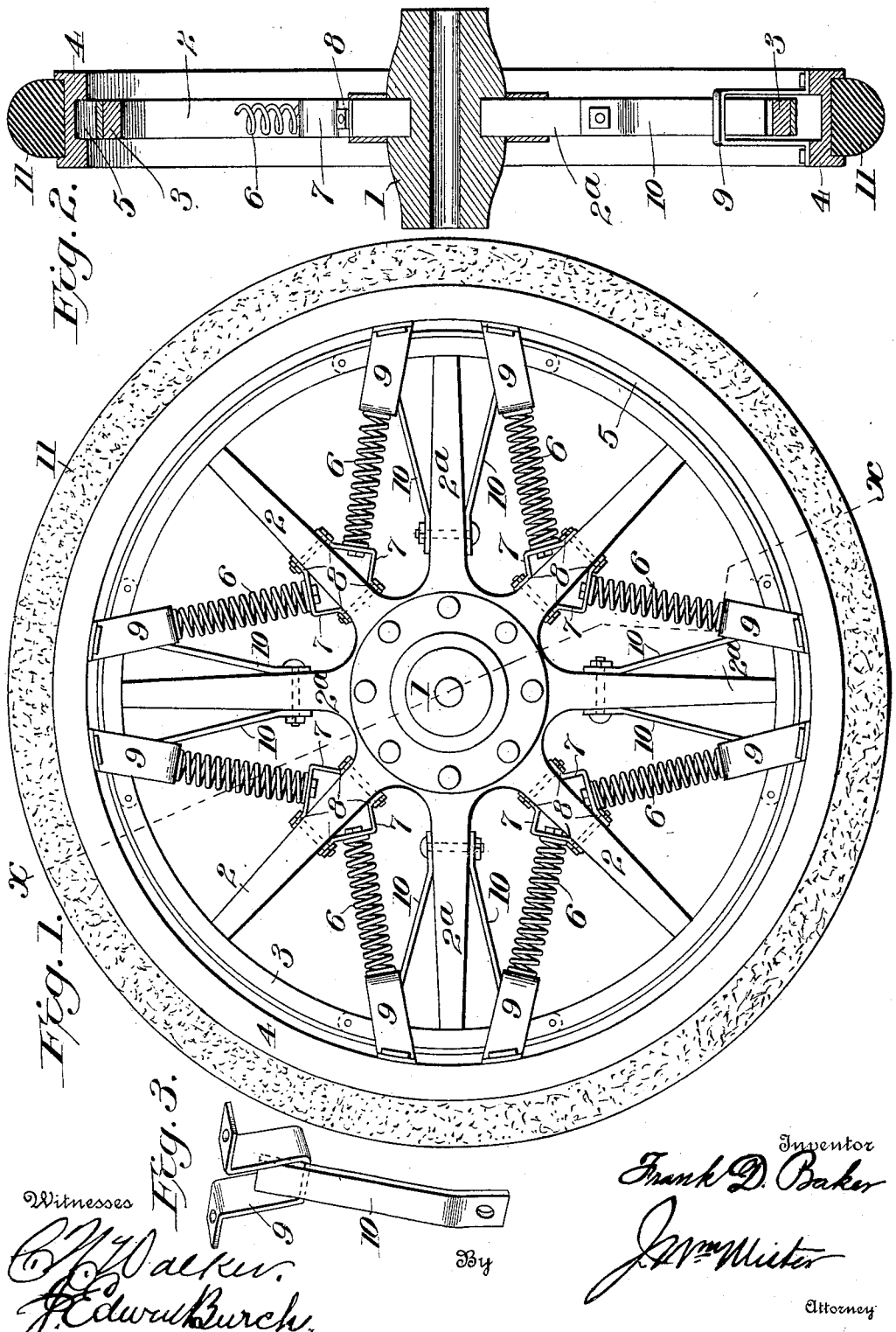

FRANK D. BAKER, OF CORSICA, OHIO.

AUTOMOBILE-WHEEL.

969,024.  Specification of Letters Patent.  Patented Aug. 30, 1910.

Application filed December 24, 1909. Serial No. 534,768.

*To all whom it may concern:*

Be it known that I, FRANK D. BAKER, citizen of the United States, residing at Corsica, in the county of Morrow and State of Ohio, have invented certain new and useful Improvements in Automobile-Wheels, of which the following is a specification.

My invention relates to improvements in vehicle wheels, more especially that type designed for automobiles.

It has for its object to provide the requisite resiliency to render the wheel light, yet strong and durable, and easy going or running and to compensate for shocks or concussions when the wheel may contact with ordinary obstructions in the line of travel.

It has, also, for a further object, to carry out these ends in a simple and relatively inexpensive way, as well as to provide for its ready embodiment in automobiles of general construction, without involving other than the minimum cost in effecting such embodiment.

The nature of the invention consists of combinations of parts substantially as hereinafter fully disclosed and defined by the claims.

In the accompanying drawing illustrating the preferred disclosure or embodiment of my invention: Figure 1 is a side elevation thereof. Fig. 2 is a transverse section of the same taken through a flat spring on the line $x$—$x$ of Fig. 1, viewing toward a coiled spring and its spoke and outer rim attaching bracket. Fig. 3 is a detached view showing more clearly the connection between the flat springs and brackets.

In carrying out my invention, I suitably provide a central portion or hub 1 of well known or preferred general construction, adapted to receive the inner ends of spokes 2 mortised or otherwise set into the same.

Applied to the outer ends of the spokes 2, preferably provided with tenons, is a felly or inner rim 3 being of the construction or make-up according to the material of which it may be made, whether of wood or metal, and adapted to receive said tenons firmly held therein in any suitable way. Arranged concentrically to said felly or inner rim 3, is an outer rim 4 which, however, is also spaced off a short interval from said inner rim, as at 5, sufficient to permit of a limited amount of independent movement of the outer rim with relation to said inner rim to compensate for jars or concussions transmitted to the same in the line of travel of the wheel. Said outer rim, which may be of wood or metal, is yieldingly upheld or retained in position by means of stout coiled or helical metal springs 6 secured or connected at their inner ends to preferably iron brackets 7 bolted to alternate spokes 2, in the plane of the wheel, and about at their midlengths. Said brackets are angular or substantially V-shaped in general outline having their divergent ends formed with plate-like extensions or terminals adapted for the passage therethrough of the fastening bolts therefor, entering the spokes. Said springs are extended obliquely or at an obtuse angle from said spokes, or rather their inner-end securing brackets, and have their opposite or outer ends connected to stout strong iron brackets or stirrups 9 approximately U-shaped in outline and embracing and secured to the outer rim 4 in any suitable way. From the aforesaid arrangement or application of the springs 6 to said spokes and outer rim, it will be noted that they serve to mutually brace and strengthen each other and uniformly distribute the spring pressure, so as to counteract unequal stress or thrust of the individual springs one upon the other, thus serving to maintain the outer rim at an initial uniform space or interval off from the inner rim and allowing the requisite compression of the springs without contact between the two rims, as necessary for effective action when the wheel is in service. Additional, preferably flat metal springs 10 are applied to the other or intermediate spokes $2^a$, the inner ends of said springs being suitably secured to said spokes, in the plane of the wheel, near the inner ends of the spokes, the outer free ends of said flat-metal springs being arranged or deflected to be received by the outer end spring-attaching brackets 9, in order to guard against the spokes casually contacting with said brackets during the travel or rotation of the wheel.

To the outer rim 4 is suitably secured or applied a solid rubber tire or tread 11, as is usual in this class of wheels, for promoting easy traveling or running of the vehicle.

It will be apparent that I have produced an exceedingly strong, durable and desirable wheel, and which it is believed is capable of being constructed at the minimum cost, while it possesses the above recited additional qualities of having just the requisite resiliency, lightness and a well balanced arrangement of parts.

It is assumed that I have the right under my patent to change the details herein without departing from the spirit of my invention and said invention yet be protected.

I claim:—

1. A wheel of the class described, including an outer rim and inner rim spaced apart from each other, spokes connected to said inner rim, approximately V-shaped brackets fixed to certain of said spokes intermediate their ends, springs connected to said brackets at their inner ends, approximately U-shaped brackets connected to said outer rim and having said springs connected thereto, at their outer ends, and flat springs outstanding from said spokes and having their outer free ends received by said U-shaped brackets.

2. A wheel of the class described, comprising an outer rim and an inner rim spaced off from each other, spokes connected to said inner rim, certain of said spokes being provided with angular brackets intermediate their lengths, springs connected to said brackets U-shaped brackets connected to said outer rim and having said springs connected thereto at their outer ends, said springs extending obliquely from said spokes, and flat springs having their inner ends connected to certain others of said spokes and having their divergent free ends received by said U-shaped brackets.

In testimony whereof I affix my signature, in presence of two witnesses.

FRANK D. BAKER.

Witnesses:
 HARRY E. ERICKSON,
 S. S. WILLIAMS.